Dec. 10, 1929.  C. G. MUNTERS ET AL  1,738,720
REFRIGERATION
Filed June 15, 1926  4 Sheets-Sheet 1
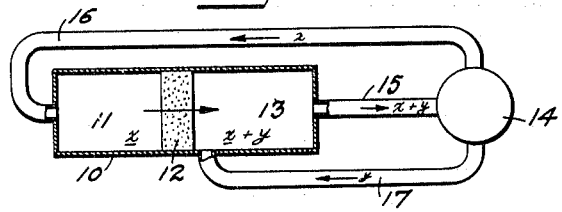
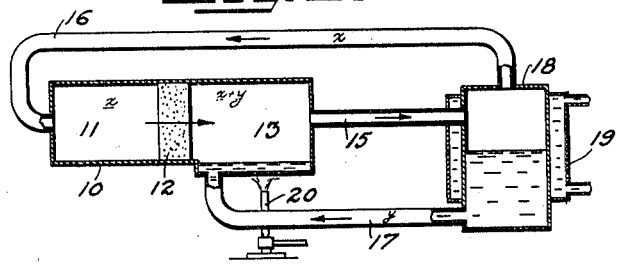
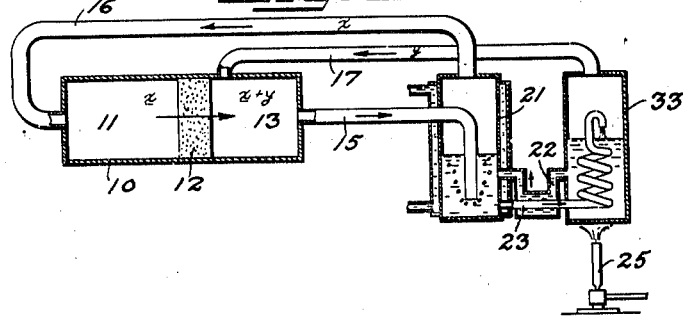
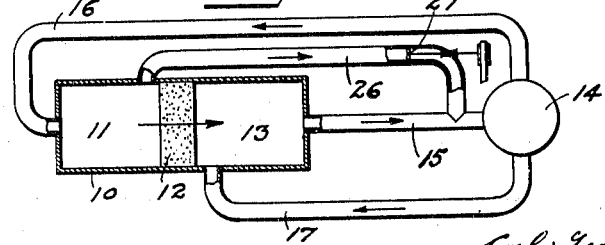

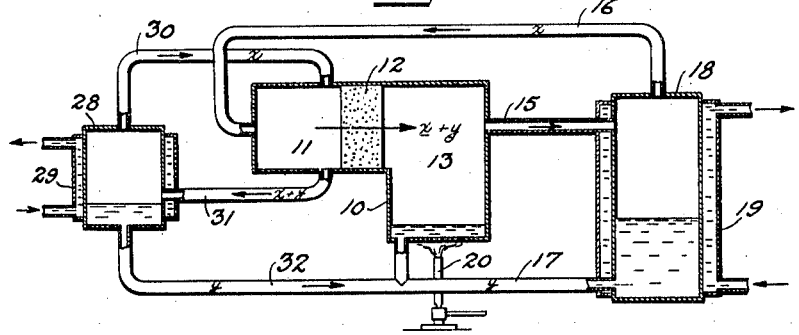
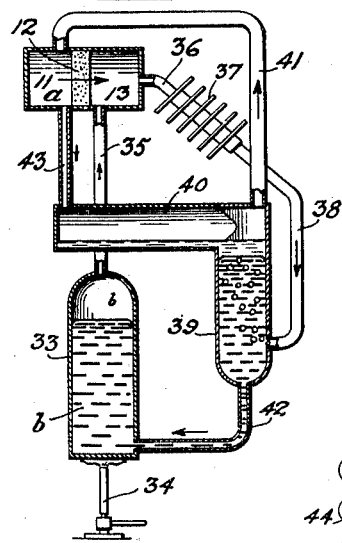
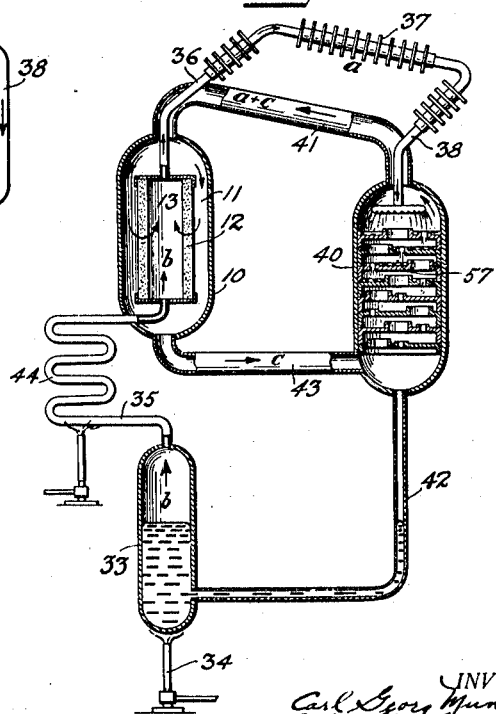

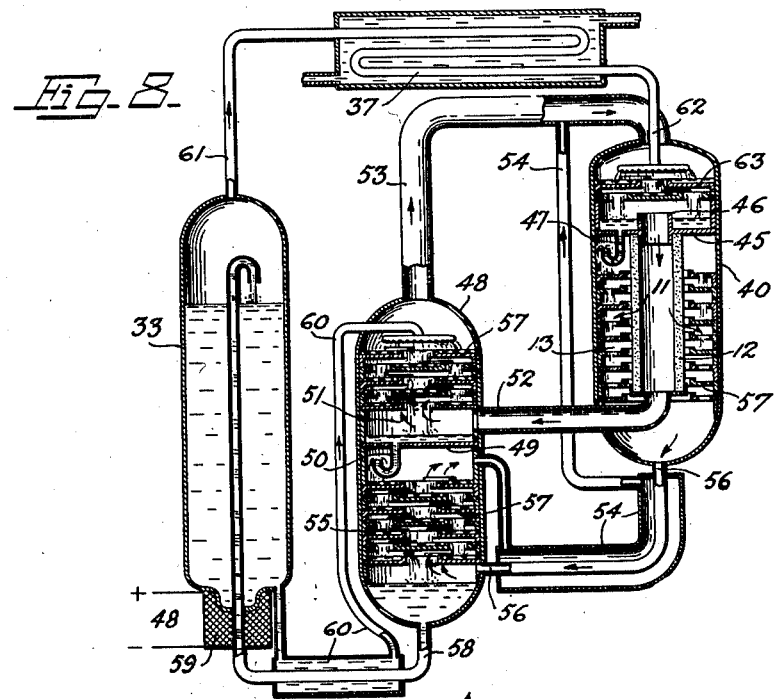
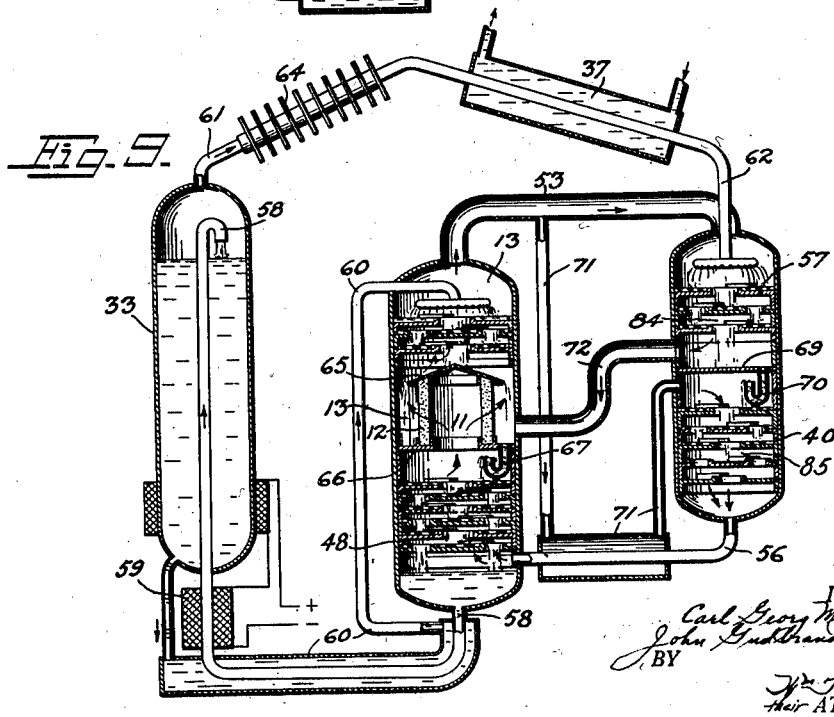

Dec. 10, 1929.  C. G. MUNTERS ET AL  1,738,720
REFRIGERATION
Filed June 15, 1926   4 Sheets-Sheet 4

Fig. 10.

Patented Dec. 10, 1929

1,738,720

UNITED STATES PATENT OFFICE

CARL GEORG MUNTERS, OF STOCKHOLM, AND JOHN GUDBRAND TANDBERG, OF LUND, SWEDEN, ASSIGNORS TO ELECTROLUX SERVEL CORPORATION, OF NEW YORK, N. Y., A CORPORATION OF DELAWARE

REFRIGERATION

Application filed June 15, 1926, Serial No. 116,111, and in Sweden December 2, 1925.

The present invention relates to fluid circulation and has for its prime object to effect a circulation of a fluid such as a gas within a closed cycle by or under the influence of changes in intrinsic conditions of cooperating fluids. The invention aims to provide an effective circulation in a novel manner without the aid of mechanical propelling devices such as fans or pumps.

More particularly the invention relates to refrigerating apparatus, especially to such apparatus wherein equalization of pressure is obtained throughout one or more circulating cycles by the supplemental diffusion of substances within each other.

One phase of the invention consists in the method of moving a fluid in a closed cycle comprising interposing a porous flow resistance such as a wall of unglazed clay within the cycle, introducing a supplemental fluid on one side of the porous flow resistance to cause a drop in partial pressure of the cycle fluid and movement of fluid in direction through the resistance toward that side to which the supplemental fluid is introduced and separating the supplemental fluid from the cycle fluid and from the cycle of circulation before the cycle fluid has passed through the cycle to the other side of the porous resistance. In further developed phases of the invention, this cycle process is developed to give continuous operation; to provide continuous cycles of various substances or combinations of substances; to effect separation of fluids in various manners, as by condensation and absorption; and to circulate various gases within refrigerating cycles.

The invention also comprises apparatus for carrying out the above outlined method and various amplifications of the same and also comprises various forms of refrigerating apparatus wherein flow of cooling agent or auxiliary agent or other fluid is caused to take place or augmented by application of the principle of operation of the invention.

The invention, its various objects, its operation, and its applications are fully set out in the following description which is given with reference to accompanying drawings wherein; Fig. 1 illustrates diagrammatically the principle of operation of the invention; Fig. 2 illustrates diagrammatically one manner of carrying out a phase of the principle illustrated by Fig. 1; Fig. 3 illustrates an alternative manner of carrying out the phase illustrated by Fig. 1; Fig. 4 illustrates an added feature of obtaining a continuous operation; Fig. 5 shows an arrangement according to the invention for continuous operation wherein separation of fluids takes place by condensation in two cycles; Fig. 6 shows one form of refrigerating apparatus to which the invention is applied; Fig. 7 shows a second form of refrigerating apparatus to which the invention is applied and wherein there is used a greater number of fluids than in the previous arrangements; Fig. 8 shows another modification of the invention embodied in refrigerating apparatus wherein the porous wall, which is common to all forms of the invention, is placed in that portion of the refrigerator which is known as the refrigerating member or evaporator; Fig. 9 shows still a further form of refrigerating apparatus embodying the invention wherein the porous wall is inserted in that portion of the apparatus which is known as the absorber and wherein there is a double circulation between the absorber and evaporator; and Fig. 10 shows a refrigerating apparatus wherein the invention is applied to cause circulation of liquid.

Fig. 1 illustrates diagrammatically the principle of operation of the invention and shows a closed cycle conduit system comprising a diffusion vessel 10, in which there is inserted a separating wall 12 of porous material, for example clay or the like, which wall separates the vessel 10 into two chambers or spaces 11 and 13. Space 13 communicates with the inlet of a separator 14 of any desired kind by means of a conduit 15. The outlet for the separator is connected with space 11 by means of a conduit 16 and is connected with the space 13 by means of a conduit 17.

Assume that the system is filled with a cycle gas $x$ and that the pressure is the same throughout the system. If now a supplemental gas $y$ is admitted through conduit 17 into space 13, the partial pressure of gas $x$ in this space is diminished, as a result of which gas $x$ begins to diffuse through the porous wall from space 11 to space 13. Gas $y$ should have a greater molecular weight than gas $x$ in order to prevent, to as great an extent as possible, flow of gas $y$ through wall 12 in counter-flow to gas $x$, since the rate of flow of gases through a porous wall is in inverse proportion to the square roots of their molecular weights. The mixture of the two gases $x$ and $y$ formed in space 13 flows through conduit 15 to the separator 14 where the different gases are separated whereafter gas $x$ flows to space 11 through conduit 16, while gas $y$ flows to space 13 through conduit 17. There is thus produced a circulation of gas $x$ from space 11 through the wall 12, through space 13, through conduit 15, through separator 14, through conduit 16, and back to space 11.

If it be assumed, first, that the separation of the two gases in separator 14 is complete and, second, that no part of the gas $y$ diffuses through wall 12 from space 13 to space 11 in counter-direction to the diffusional flow of gas $x$ and, third, that the supply of gas $y$ to the space 13 is continuous, the result will be a continuous circulation of gas $x$. In practice this ideal condition cannot be obtained since the separation of the two gases cannot be complete and some part of the gas $y$ will diffuse through wall 12 from space 13 to space 11 and a practical operating structure built to operate on this principle and designed to give continuous cycle flow must be made to function despite incomplete separation of the gas mixture and despite the counter-diffusion of gas $y$ through wall 12 in counter-flow to gas $x$. Various practical operative structures functioning to give continuous operation are described further on in this specification.

With reference to the separation of gases, the separator 14 can be of any kind and may operate on any principle such as condensation, absorption, distillation, atmolysis, or a combination of two or more of these processes. The question as to which mode of separation is most suitable depends in each case upon the conditions of operation and the nature of the particular fluids used. The modes of separation illustrated hereinbelow are to be considered as merely illustratory.

Fig. 2 shows diagrammatically the effecting of separation by means of condensation. The gases $x$ and $y$ flow from the space 13 through conduit 15 and into the condenser 18 where the gas $y$ is caused to condense, for which purpose the condenser is supplied with a cooling jacket 19 through which cold water may circulate. The condensate flows through conduit 17 into space 13 where the liquid is again vaporized, for example by heat supplied by burner 20. As in the previous case, there is here obtained a circulation of gas $x$ from space 11, through porous wall 12, through space 13, through conduit 15, through condenser 18, through conduit 16 and back to the space 11, since the gas $y$ is supplied on one side of the wall 12 in space 13 as a result of which the partial pressure of gas $x$ is less in this space than in space 11.

Fig. 3 shows a further manner of separating the gases, namely by absorption. The gas mixture passes through conduit 15 into an absorber 21 where it comes into contact with an absorption liquid, which is capable of absorbing the gas $y$ but not gas $x$ so that gas $x$ bubbles up through the absorption liquid and flows unabsorbed back to the space 11 through conduit 16. The absorber 21 is connected by means of two conduits 22 and 23 with a generator 33, which is heated by means of, for example, a burner 25. Conduit 23 connects with the lower portion of the absorber and passes upwardly through the liquid in generator 33, opening above the level of liquid within the generator. Conduit 22 opens below the liquid level in vessels 21 and 24. Gas $y$ is expelled from the absorption liquid in the generator on account of the application of heat and passes back through conduit 17 to space 13. Weak absorption liquid flows by gravity from generator 33 through conduit 22 and into absorber 21 where it is saturated with gas $y$, after which the liquid which is enriched with the gas $y$ passes back through conduit 23 to generator 33. Circulation of the absorption liquid is maintained by means of the thermo-siphon operation in the upwardly extending part of conduit 23 which lifts the liquid of the absorber to a somewhat higher level in the generator.

Fig. 4 shows an arrangement in the designing of which, in order to obtain continuous operation, consideration has been taken of the fact that, as always will be the case in practice, a part of the supplemental gas $y$ passes along with the cycle gas $x$ through conduit 16 and a part of the supplemental gas $y$ diffuses through the porous wall 12 in counter-flow to the circulating gas $x$ and provision has been made for these factors. As a result of this transportation to and diffusion of gas $y$ into chamber 11 there would gradually occur in chamber 11 an accumulation of supplemental gas which would tend to form a sort of pillow close to the porous wall 12 and hinder the passage of the cycle gas through the wall. In order to prevent this, the supplemental gas $y$ is carried away from the chamber 11 through a conduit 26 which connects the space 11 close to the porous wall 12. The operation is here illustrated by showing a fan 27 in conduit 26. In this manner the supplemental gas $y$ which is carried away is mixed with the circulating gas $x$ and the mixture can be separated in any desired way, for example by means of condensation, absorption, distillation, atmolysis, or a combination of two or more of these methods of separation.

In the modification illustrated, the gas mixture which is carried away from chamber 11 is mixed with the gas mixture passing through conduit 15 before it is separated.

In the last described arrangement the gas mixture removed from the inflow side of the porous wall is separated in the same separator 14 in which the gas mixture which is conducted away from the outflow side or the porous wall is separated. To so combine the separators is not necessary and, in fact, an advantage is gained by using a separate separator for the gas mixture withdrawn from the inflow side, in that, by using separate separators, no mechanical arrangement, such as fan 27, is necessary in order to obtain a pressure difference between the separator 14 where there is higher pressure and the space 11 where the pressure is lower.

Fig. 5 shows an arrangement wherein two separate separators are used, each consisting of a condenser. The mixture of gases $x$ and $y$ flows from the space 13 through conduit 15 and into the condenser 18 which is equipped with a cooling jacket 19, through which cold water may flow. Gas $y$ condenses in condenser 18. The gas $x$ flows uncondensed through conduit 16 back to space 11 to the inflow side of the porous wall. The condensate from the condenser 18 flows through conduit 17 into the space 13 where it is again vaporized, for example by the heat of burner 20. So far the arrangement of Fig. 5 is similar to that of Fig. 2.

The separation in condenser 18 is assumed not to be complete so that a portion of the fluid $y$ in gas form passes along with the gas $x$ through conduit 16 and back to space 11. Furthermore, a portion of the gas $y$ passes from space 13 to space 11 through the porous wall 12 in counter-flow to the cycle gas. If no arrangement is provided for carrying away this portion of fluid $y$, it is evident that there would occur a condition of static equilibrium and the circulation of the gas $x$ would be stopped.

To prevent this and to obtain continuous circulation, there is arranged an auxiliary cycle circulation comprising the space 11, an auxiliary separator, which in this case consists of a condenser 28 equipped with a cooling jacket 29, and conduits 30 and 31 which connect condenser 28 with space 11. In condenser 28 gas $y$ condenses, as a result of which the partial pressure of gas $x$ in this condenser is increased and a circulation is produced through condenser 28, thence through conduit 30, thence through space 11 and thence through conduit 31 back to condenser 28. The direction of circulation is determined by the difference in specific weight between gas $x$ in condenser 28 and the mixture of gases $x$ and $y$ in space 11. The condensate produced in condenser 28 flows through conduit 32 back to space 13 where it is vaporized.

A higher liquid level in condenser 28 than in condenser 18 serves to equalize the difference of pressure between condenser 18 where the pressure is higher and condenser 28 which has a lower pressure. By this means it is unnecessary to use a separate mechanical arrangement such as a fan for the equalization of the pressure between the two separators 18 and 28.

As has previously been stated the invention has one of its most important applications in refrigerating apparatus of different kinds. Fig. 6 shows such an apparatus in which the invention is applied for the production of circulation of a cooling agent which is caused to pass through a cycle for the production of refrigeration.

In a generator 33 a fluid $b$ is heated, for example by means of a burner 34, to such a temperature that it is evaporated whereupon vapors rise upwardly and pass through conduit 35. This conduit 35 opens into the space 13 of the diffusion vessel 10 previously described, which space is separated from the space 11 by means of porous wall 12. In space 11 there is a fluid $a$ of a lower molecular weight than fluid $b$, the vapor of which diffuses through wall 12 because the partial pressure on the other side of the wall 12 in space 13 is reduced as a result of the supply of vapor of the fluid $b$. The mixture of vapors $a$ and $b$ flows through conduit 36 into a condenser 37 where both vapors $a$ and $b$ are condensed. Condenser 37 may be cooled in any suitable way. In this modification it is shown as supplied with cooling fins for cooling by air. A part of the vapors of fluid $b$ condenses in space 13 and flows through conduit 35 back into the generator 33. The condensate formed in condenser 37 flows downwardly through conduit 38 and passes into vessel 39 which is filled with fluid $b$. Fluid $a$ being lighter than fluid $b$ and the two being nonmixable, fluid $a$ passes up through fluid $b$ and into the vessel 40 which is arranged above vessel 39. The excess of pressure in generator 33 is compensated for by the difference in the level of liquid in the vessel 40 and in generator 33. In vessel 40 fluid $a$ is rapidly vaporized on account of the lower pressure, resulting in a taking up of heat from the surroundings. Vessel 40 is therefore the refrigerating member of the system. The vapor produced passes through conduit 41 back to space 11, after which the cycle is repeated. Vessel 39 is connected at the bottom with generator 33 by means of conduit 42 through which the fluid $b$ passes in liquid form. The vapors of fluid $b$, which pass through the porous wall 12 from space 13 to space 11 in counter-flow to the vapors of fluid $a$, pass through conduit 43 into the vessel 40. By suitably choosing fluid $b$ these vapors will almost immediately condense in conduit 43 and thus pass in liquid form into the vessel 40 and thus into vessel 39. It will be noted that the separation is here effected by flotation. In the above described arrangement the fluid $b$ may consist, for example, of mercury and fluid $a$ may consist of water.

In a refrigerating apparatus of the above described type there may be used an inert pressure equalizing gas. In such case the necessary liquid column between vessel 40 and generator 33 of Fig. 6 is dispensed with; that is to say, vessel 39 can entirely be dispensed with. Such an apparatus is shown in Fig. 7 in which, with respect to Fig. 6, like reference characters designate like parts.

In this case diffusion vessel 10 is shown as of cylindrical form and it contains a wall of porous material which is also cylindrical and arranged concentrically with the outer shell of the diffusion vessel. This cylindrical porous wall corresponds to wall 12 in the previously described modifications and therefore has likewise been designated by reference character 12. This wall 12 divides vessel 10 into inner and outer chambers or spaces corresponding respectively with spaces 13 and 11 of the previous figures. Vapors of fluid $b$ are introduced into space 13 as in the modification illustrated in Fig. 6, which vapor is liberated in generator 33 by addition of heat, for example by means of burner 34, and which is superheated in superheater 44. Vapors of fluid $a$ are introduced into the outer space 11, as has been above explained and these vapors diffuse through porous wall 12 into space 13 and the mixture of the vapors passes through conduit 36 into condenser 37. In this modification, also, the condenser is formed of parts of conduit 36 which are supplied with cooling fins for cooling by means of air. The first section of the condenser is preferably arranged on an incline in such manner that condensate of fluid $b$ formed in the same flows backward through space 13 and into superheater 44 and generator 33. The condensate formed in that part of condenser 37 which is inclined toward vessel 40, which consists chiefly of fluid $a$, passes through conduit 38 into vessel 40, which constitutes the refrigerating member or evaporator, in which it is preferably distributed over plates 57 arranged within the same in order to facilitate vaporization of fluid $a$. The fluid $b$ which is carried along with fluid $a$ flows down through conduit 42 and back into the generator 33. The vapor of fluid $a$ which is formed in evaporating vessel 40 flows from evaporator 40 through conduit 41 and into space 11 whereupon it again passes through the cycle.

The system comprising space 11, conduit 43, evaporator 40 and conduit 41 contains an inert pressure equalizing gas $c$ of higher molecular weight than fluid $a$. The mixture of gas $c$ and fluid $a$ in evaporator 40 has consequently a lower specific weight than the gas $c$ in space 11 which is relatively free of mixture with fluid $a$, as a result of which a circulation of the auxiliary gas is produced from space 11, through conduit 43, through evaporator 40 and through conduit 41.

In this apparatus, also, fluid $b$ may consist of mercury and fluid $a$ of water. The gas $c$ may consist of, for example nitrogen, but is preferably a gas of the highest possible molecular weight, for example, krypton or xenon.

Fig. 8 shows an absorption refrigerating apparatus operating with the aid of an inert pressure equalizing gas, in which apparatus the invention is applied to effect circulation of the inert gas between and through the absorber and the evaporator. For purposes of description, let it be assumed that the cooling agent is ammonia; the absorption liquid is water; and the pressure equalizing gas is hydrogen. Within evaporator 40, the major portion of the shell of which is of cylindrical form, is arranged, concentrically with the shell, a cylindrically formed porous wall 12 which is situated some distance from the lower and the upper ends of the evaporator. The annular space formed between wall 12 and the shell of the evaporator is closed at the top by means of a separating wall 45. The evaporator 40 is divided by means of porous wall 12 and said separating wall 45 into inner and outer spaces of chambers 11 and 13, corresponding to spaces 11 and 13 of the previous modifications. Above the separating wall 45 there is a cylindrical collar 46 which forms a continuation of porous wall 12 but which is not made of porous material. Communication is afforded through separating wall 45 by means of an inverted gooseneck 47 which forms a liquid seal.

The absorber 48 is divided into two spaces 51 and 55 by means of a separating wall 49. A second inverted gooseneck 50 connected to the wall forms a communication between the two spaces. The lower portion of the upper space 51 is connected with space 11 within porous wall 12 in evaporator 40 by means of conduit 52 and the upper part of this absorber space 51 is connected with the evaporator at a point above the separating wall 45 by means of conduit 53. A conduit 54 is connected to conduit 53 and serves to connect the upper part of evaporator 40 with the upper part of the lower space 55 of the absorber. The lower part of the space 55 is connected with the lower part of space 13 of the evaporator by means of conduit 56. The absorber 48 and evaporator 40 are provided with plates 57 which form a large surface for absorption and evaporation.

The lower part of the absorber 48 is connected with generator 33 by means of conduit 58 which extends upwardly through the generator above the level of liquid in the same and is heated by means of an electric heating element 59 which is also arranged to heat the main body of liquid in the generator. There is a further communication between generator 33 and absorber 48 through conduit 60 which is preferably arranged in heat exchange relation with conduit 58. The generator 33 is connected to condenser 37 by means of a conduit 61 and condenser 37 is connected with evaporator 40 by means of a conduit 62.

The apparatus operates in the following manner:

Ammonia vapor expelled from absorption liquid in the generator 33 passes through conduit 61 and into condenser 37 where it is condensed. The liquefied ammonia passes through conduit 62 and flows into the upper portion of the evaporator where it is distributed over plates 63 and collects in the annular space formed on separating wall 45 between collar 46 and the shell of the evaporator and collects within gooseneck 47. It passes through gooseneck 47 and into space 13 below the separating wall 45 where it evaporates on account of the lower partial pressure of ammonia which exists therein. From the inner side of the porous wall 12 hydrogen diffuses through wall 12 and the mixture of ammonia gas and hydrogen passes downwardly within space 13, through conduit 56 and into the lower part of the absorber 48. In the absorber the gas mixture is brought into contact with absorption liquid which is weak in ammonia, as a result of which ammonia gas is absorbed. The hydrogen, which is not absorbed, passes through conduit 54 and to the upper part of the evaporator 40 where it again diffuses through the wall 12 and again passes through its cycle.

The gas mixture formed in space 11 consisting of hydrogen which does not diffuse through wall 12 together with ammonia gas which has diffused into the same in the upper part of the evaporator and together with ammonia which has diffused from the outer space 13 through wall 12 and into the inner space, flows through conduit 52 to the lower part of the upper space 51 of the absorber where the gas is brought into contact with weak absorption liquid passing into the absorber from the generator through conduit 60, as a result of which the ammonia is absorbed. The hydrogen, which is not capable of being absorbed, flows through conduit 53 and back to the upper part of the evaporator. Circulation is maintained in this cycle on account of the differences in specific weight between the mixtures of ammonia gas and hydrogen in the evaporator 40 on the one hand and the specific weight of gas in the absorber 48 and conduit 53 on the other hand. The circulation within the system composed of the lower space 55 of the absorber, conduit 54, the upper part of the evaporator 40, the space 13 outside the porous wall 12 and conduit 56 is maintained due to the introduction of the ammonia as a supplemental fluid and the consequent diffusion through wall 12 and the existence of higher pressure in space 13 and in the lower part of the absorber than in the upper part of the evaporator as a result of the diffusion of hydrogen through wall 12 and due to the differences in specific weights of the vertically extending bodies. The hydrogen which passes into the upper part of the evaporator through conduits 53 and 54 is effectively freed from the vapor of water which may be carried along with it since it comes in intimate contact with the liquid ammonia which passes into the evaporator through conduit 62. This is of importance since the porous wall should not become damp, because dampness decreases the efficiency of the porous wall or may even prevent its effective operation.

Spaces 51 and 55 of absorber 48 are, in effect, two absorbers, both supplied with weak absorption liquid from the generator, one absorber receiving gaseous fluid from space 11 and the other receiving gaseous fluid from space 13, and both absorbers delivering hydrogen to space 11. The separation in this case is effected first by absorption in the lower space 55 of absorber 48 wherein the supplemental fluid, ammonia, is absorbed in the water. This separation is supplemented by a further separation of the ammonia from the water absorption liquid which includes vaporization in generator 33 and subsequent condensation of the ammonia to introduce the same into the evaporator in liquid form.

In the arrangement shown in Fig. 8 the porous wall is arranged in the evaporator. Fig. 9 shows a refrigerating apparatus of the absorption type in which the porous wall 12 is arranged in the absorber. It will be assumed, in order to reduce the length of description, but without limitation, that in this case, also, the cooling medium is ammonia, the absorption liquid is water and the pressure equalizing medium is hydrogen.

Generator 33 is connected with condenser 37 by means of conduit 61. Conduit 62 connects the condenser with evaporator 40. In this illustration a portion of conduit 61 is supplied with cooling fins 64 and inclined in such manner that water vapor passing from the generator is condensed in this section of conduit 61 and flows back into the generator 33. As in the previous modification, the generator is connected with absorber 48 by means of two conduits 58 and 60 which are in part arranged in heat exchange relation. Conduit 58 carries rich absorption liquid from the absorber to the generator and conduit 60 carries weak absorption liquid from the generator to the absorber. The generator and conduit 58 are heated by electric heating element 59.

The porous wall 12 is placed within absorber 48 and is formed as a cylinder on the top of which rests a plate 65. The porous wall rests on a separating wall 66 which is attached to the outer shell of the absorber. This separating wall 66 is provided with an inverted gooseneck 67 which affords communication through the same and acts as a liquid seal. The porous wall 12 together with plate 65, separating wall 66 and the liquid seal divide the absorber into two spaces, an upper space 13 and a lower space 11, so designated because they correspond to similarly designated parts of the previous modifications.

The evaporator 40 is separated into two spaces or chambers 84 and 85 by means of a separating wall 69. Communication through this separating wall 69 is afforded by means of an inverted gooseneck 70 which also forms a liquid seal.

The lower space 85 of the evaporator is connected with the lower space 11 of the absorber by means of a conduit 56 which is arranged in heat exchange relation with a conduit 71 which connects the upper part of the absorber with the upper part of the lower space 85 of the evaporator. A conduit 72 connects the lower part of the upper space 84 of the evaporator with the lower part of the upper space 13 of the absorber. The upper part of the absorber is connected with the upper part of the evaporator by means of conduit 53.

The apparatus operates in the following manner:

Ammonia expelled within the generator 33 passes through conduit 61 to the condenser 37 from which liquid ammonia flows through conduit 62 into the upper space 84 of the evaporator where it is distributed over plates 57 and from which it passes through gooseneck 70 into the lower space 85 of the evaporator in which it evaporates while absorbing heat from the surroundings. In this lower space of the evaporator the ammonia is mixed with hydrogen which passes from the absorber through conduit 71 and the mixture of hydrogen and ammonia vapor passes through conduit 56 into absorber 48. A portion of the liquid ammonia which passes through conduit 62 will have evaporated in the upper portion of the evaporator whereupon the vapors of ammonia together with the hydrogen supplied through conduit 53 mix and pass through conduit 72 into the upper portion of the absorber. Since the partial pressure of the hydrogen in the upper part of space 11, that is to say in the upper part of the lower portion of the absorber, is greater than in the lower part of space 13, that is to say in the lower part of the upper space of the absorber, as a result of this operation, the hydrogen diffuses through the porous wall from space 11 and into space 13. The ammonia vapors entering the absorber through conduit 56 are absorbed by the liquid which passes into the upper part of the absorber and which passes through the inverted gooseneck 67. The ammonia which passes through conduit 72 into the absorber is likewise absorbed. Unabsorbed hydrogen entering through conduit 72 together with hydrogen which diffuses through porous wall 12 flows back into the evaporator 40, the greater portion through conduit 71 and a lesser part through conduit 53.

The circulation in the auxiliary cycle, that is to say the upper portion of the absorber, conduit 53, the upper part 84 of the evaporator and conduit 72 is maintained by means of difference in specific weights of gases in the evaporator, the absorber and connected conduits. The circulation in the main circulatory cycle which consists of the absorber, conduit 53, conduit 71, the lower space 85 of the evaporator, and conduit 56 is maintained on account of the rise of pressure which is produced in the space 13 as a result of the diffusion of the hydrogen through the porous wall.

As has been previously pointed out, the movement of the cycle gas can be utilized to transport a different fluid. For example, in the application of the invention to a refrigerating apparatus, this movement can be utilized to obtain circulation of liquid within the apparatus. Fig. 10 shows such an arrangement, adapted to refrigerating apparatus of the absorption type. As previously, it will be assumed, without limitation however, that the cooling medium is ammonia, the absorption liquid is water and the pressure equalizing medium is hydrogen. Like reference characters designate corresponding parts with previous modifications.

In this modification the porous wall 12 is arranged in the upper part of the evaporator. The lower part of the wall 12 which is cylindrically shaped is closed by means of a container 73 of non-porous material. The upper part of the wall is closed by means of a bell 74 which together with the container 73 and the porous wall 12 divide the evaporator into two spaces, an outer and an inner, corresponding to the previously described spaces 11 and 13 and therefore similarly designated. The conduit 62 which connects the condenser 37 with the evaporator extends through the bell 74 and ends in an inverted gooseneck 88 which forms a liquid seal. A conduit 75 of substantially U-form is connected with container 73 and opens into the lower part of the outer space 11. Container 73 is connected by means of a conduit 76 with a bell 77 which is placed in the lower part of the absorber 48. A conduit 78 extends from within bell 77 upwardly and within a receptacle 79 arranged in the upper part of the absorber. The upper end of conduit 78 ends in a gooseneck bend, the opening of which is situated above the level of liquid in receptacle 79. A conduit 58 connects receptacle 79 with generator 33 and conducts strong liquor from receptacle 79 thereto. A conduit 60 for carrying weak absorption liquid connects the lower part of generator 33 with the upper part of absorber 48.

The apparatus operates as follows:

The ammonia liquefied in condenser 37 flows in liquid form through conduit 62 down into the upper part of space 13. After leaving conduit 62 the liquid flows down into the space within the porous wall through a central opening in a plate 80. The purpose of this arrangement is to prevent the liquid from flowing directly on to the porous wall. The ammonia is partially evaporated and, acting as a supplemental gas, there is a diffusion of hydrogen through wall 12, which hydrogen is supplied through conduit 53 from the absorber. By this means a superpressure is produced in space 13 which corresponds to the height of liquid in conduit 62. The hydrogen which diffuses through the porous wall flows through conduit 76 into bell 77. In this bell 77 there will be a higher pressure than in the absorber in general, as a result of which the rich ammonia solution entrained in the bell is pushed downwardly until a difference of level is reached in the absorber which corresponds to the column of liquid ammonia in conduit 62. The arrangement is so devised and filled that the level of liquid in the bell will stand approximately at the lower opening of conduit 78 and ammonia solution will be forced up into conduit 78 to the same level as the outer level in the absorber. On further rise of pressure in space 13 and bell 77 a movement of liquid columns will take place through conduit 78 up into receptacle 79 from which the strong ammonia solution passes through conduit 58 into the generator 33. This movement of rich ammonia solution from bell 77 up into vessel 79 will take place intermittently in the form of individual liquid columns of ammonia solution, since the lower opening of conduit 78 will be alternately opened and closed by the liquid present in the lower portion of bell 77. The column of ammonia in conduit 62 corresponding to the level of liquid in the absorber corresponds to the sum of the individual columns in conduit 78.

Liquid ammonia will flow from plate 80 down into container 73 and conduit 75 where it will assume such a position that the difference of height of liquid in the two legs of conduit 75 will be equivalent to the height of ammonia liquid in column 62. Ammonia flows out from conduit 75 and is distributed over plates 57 within the evaporator and evaporates. The mixture of ammonia vapor and hydrogen which does not diffuse through the porous wall passes through conduit 56 and into the absorber 48 where the gas mixture meets the weak ammonia solution which is supplied thereto from the generator, the ammonia being thus absorbed, while the hydrogen is liberated and flows back through conduit 53 to the evaporator so that the cycle may repeat.

In this modification the pressure in the inner space 13 has been used to maintain a circulation of absorption liquid through the absorber and generator. The bell 77 which has been shown as placed in the lower part of the absorber can obviously be placed in various other parts of the circulating system.

While we have described various forms of our invention it is to be understood that the invention is not limited to the modifications which have been herein illustrated and described.

It will be noted that the words gas and vapor have been used interchangeably in the above description.

What we claim is:

1. The method of moving a fluid in a closed cycle which comprises interposing a porous flow resistance in the cycle, introducing a supplemental fluid on one side of the porous flow resistance to cause a drop in partial pressure of the cycle fluid and movement of fluid in direction through the resistance to the said one side, separating the supplemental fluid from the cycle fluid and removing it from the cycle before the cycle fluid has passed through the cycle to the other side of the porous resistance.

2. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side, permitting the resultant mixture to flow within the cycle and separating the supplemental gas from the cycle gas and removing it from the cycle before the cycle gas has passed through the cycle to the other side of the porous resistance.

3. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side, whereby said one side becomes an outflow side, separating the supplemental gas from the cycle gas and removing it from the cycle before the cycle gas has passed through the cycle to the inlet side of the porous resistance and reintroducing the supplemental gas into the cycle on the outflow side of the porous flow resistance.

4. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby said one side constitutes an outflow side, separating the supplemental gas from the cycle gas and removing it from the cycle before the cycle gas has passed through the cycle to the inlet side of the porous resistance and removing from the inlet side thereof supplemental gas which has diffused through the porous resistance and has been entrained with the cycle gas.

5. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby said one side constitutes an outflow side, condensing the supplemental gas and thus separating it from the cycle gas and removing the condensed supplemental gas from the cycle while permitting the cycle gas to complete the cycle by passing to the inlet side of the porous resistance and again through the resistance.

6. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby said one side constitutes an outflow side, condensing the supplemental gas and removing it from the cycle before the cycle gas has passed through the cycle to the inlet side of the porous resistance, vaporizing the removed condensed supplemental gas and reintroducing the same into the cycle on the outflow side of the resistance, removing mixed cycle gas and supplemental gas from the inflow side of the resistance, condensing the supplemental gas last removed, returning the removed cycle gas to the inlet side of the porous material, conducting the last condensed supplemental gas away from the presence of the cycle gas, vaporizing the last condensed supplemental gas and reintroducing the same on the outflow side of the resistance.

7. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby said one side constitutes an outflow side, separating the supplemental gas from the cycle gas, removing the separated supplemental gas from the cycle before the cycle gas has passed through the cycle to the inlet side of the porous resistance, reintroducing the supplemental gas into the cycle on the outflow side of the porous resistance, removing the supplemental gas from the inlet side of the porous resistance and reintroducing the last removed supplemental gas into the cycle on the outflow side of the porous flow resistance.

8. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby the said one side constitutes an outflow side, introducing the mixture of cycle gas and supplemental gas thus formed into the presence of an absorbing agent capable of absorbing the supplemental gas but not the cycle gas, returning the cycle gas through the cycle to the inlet side of the porous resistance, removing the absorbing agent containing the supplemental gas from the cycle, expelling the supplemental gas from the absorbing agent, and reintroducing the supplemental gas into the cycle on the outflow side of the porous resistance.

9. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby said one side constitutes an outflow side, condensing the supplemental gas and removing it from the cycle before the cycle gas has passed through the cycle to the inlet side of the porous resistance, vaporizing the removed condensed supplemental gas and reintroducing the same into the cycle on the outflow side of the resistance, removing supplemental gas from the inflow side of the resistance and reintroducing the last removed supplemental gas into the cycle on the outflow side of the resistance.

10. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby the said one side constitutes an outflow side, introducing the mixture of cycle gas and supplemental gas thus formed into the presence of an absorbing agent capable of absorbing the supplemental gas but not the cycle gas, returning the cycle gas through the cycle to the inlet side of the porous resistance, removing the absorbing agent containing the supplemental gas from the cycle, expelling the supplemental gas from the absorbing agent, reintroducing the supplemental gas into the cycle on the outflow side of the porous resistance, and reintroducing the absorbing agent into the presence of the mixture of cycle and supplemental gas.

11. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby the said one side constitutes an outflow side, introducing the mixture of cycle gas and supplemental gas thus formed into the presence of an absorbing agent capable of absorbing the supplemental gas but not the cycle gas, returning the cycle gas through the cycle to the inlet side of the porous resistance, removing the absorbing agent containing the supplemental gas from the cycle, expelling the supplemental gas from the absorbing agent, reintroducing the supplemental gas into the cycle on the outflow side of the porous resistance, removing supplemental gas from the inflow side of the porous resistance, introducing the supplemental gas last removed into the presence of an absorbing agent, expelling the supplemental gas last removed from the last absorbing agent and reintroducing the same into the cycle on the outflow side of the porous resistance, reintroducing the first absorbing agent into the cycle into the presence of the mixture of cycle gas and supplemental gas, and reintroducing the second absorbing agent into the presence of the supplemental gas removed from the inlet side of the porous resistance.

12. A system for circulation of a gas comprising a diffusion vessel containing a first chamber and a second chamber, a porous wall between said chambers, means to introduce a supplemental fluid into said second chamber, a separator for separating the cycle gas from said supplemental fluid, connections between said separator and both said first chamber and said second chamber and means to withdraw separated supplemental fluid from said separator.

13. A system for circulation of fluids comprising a diffusion vessel containing a first chamber and a second chamber, a porous wall between said chambers, a separator and means including conduit connections for obtaining a circuit of circulation of one fluid from said second chamber to said separator and back to said second chamber and a second circuit of circulation for a second fluid from said second chamber to said separator, from said separator to said first chamber and from said first chamber to said second chamber through said porous wall.

14. A system for circulation of fluids comprising a diffusion vessel containing a first chamber and a second chamber, a porous wall between said chambers, a separator, means including conduit connections for obtaining a circuit of circulation of one fluid from said second chamber to said separator and back to said second chamber and a second circuit of circulation for a second fluid from said second chamber to said separator, from said separator to said first chamber and from said first chamber back to said second chamber through said porous wall, a second separator and means for obtaining a third circuit of circulation for fluid from said first chamber to said second separator and back to said first chamber and a fourth circuit of circulation for fluid from said first chamber to said second separator, from said second separator to said second chamber and through said porous wall back to said first chamber.

15. A system for circulation of fluids comprising a diffusion vessel containing a first chamber and a second chamber, a porous wall between said chambers, a separator and means including conduit connections for obtaining a circuit of circulation of one fluid from said second chamber to said separator and back to said second chamber, a second circuit of circulation for a second fluid from said second chamber to said separator, from said separator to said first chamber and from said first chamber to said second chamber through said porous wall and a third circuit of circulation from said first chamber to said separator, from said separator to said second chamber and back to said first chamber through said porous wall, the fluids being so chosen that there is a preponderating resultant flow in one direction through said porous wall.

16. A system for circulation of a gas comprising a diffusion vessel containing a first chamber and a second chamber, a porous wall between said chambers, means to introduce a supplemental fluid into said second chamber, a separator for separating the cycle gas from said supplemental fluid, connections between said separator and both said first chamber and said second chamber, means to withdraw separated supplemental fluid from said separator, a second separator, means to conduct fluid from said first chamber to said second separator, means to conduct cycle gas from said second separator back to said first chamber and means to withdraw supplemental fluid from said second separator.

17. A system for circulation of fluids comprising a diffusion vessel containing a first chamber and a second chamber, a porous wall between said chambers, an absorber, a generator, a separator, means to conduct fluid from said second chamber to said absorber, means to conduct unabsorbed fluid from said absorber to said first chamber, means to conduct absorption liquid from said absorber to said generator, means to conduct absorption liquid from said generator to said absorber, the connecting means between the generator and the absorber being arranged to obtain circulation under the influence of heat, means to conduct fluid vaporized in the generator to said second chamber, means to conduct fluid from said first chamber to said separator, means to conduct fluid from said separator to said first chamber, and means to conduct fluid from said separator to said second chamber.

18. A system for circulation of fluids comprising a diffusion vessel containing a first chamber and a second chamber, a porous wall between said chambers, a first absorber, a second absorber, generating means, means to conduct fluid from said second chamber to said first absorber, means to conduct fluid from said first absorber to said first chamber, means to conduct fluid from said first chamber to said second absorber, means to conduct unabsorbed fluid from said second absorber to said first chamber, means to conduct absorbed fluid from said first absorber and said second absorber to said generating means, means to expel absorbed fluid in said generating means and conduct the expelled fluid to said second chamber, and means to conduct absorption fluid from said generating means to said first absorber and to said second absorber.

19. The method of circulating a gas which comprises forming an excess pressure on one side of a porous material by mixture of fluids and diffusion of one of said fluids through said porous material and moving the fluids in one or more cycles of circulation under the influence of the excess pressure produced.

20. Refrigerating apparatus comprising a generator for expelling a cooling agent from a solution thereof in an absorbing agent, a condenser for condensing the cooling agent communicating with said generator, an evaporator communicating with said condenser and divided into a first chamber and a second chamber, a porous wall forming a restricted communication between said first chamber and said second chamber, means for permitting liquid cooling agent supplied to said evaporator from said condenser to enter said second chamber, an absorber, a first absorbing space and a second absorbing space within said absorber, a connection for conducting an auxiliary agent contained within the apparatus from said first absorbing space to said first chamber, a connection for conducting that portion of the auxiliary gas which does not diffuse through said porous wall back from said first chamber to said first absorbing space, a connection for conducting the mixture of the auxiliary agent and the cooling agent thereinto diffused in said second chamber to said second absorbing space, a connection for conducting the auxiliary agent from said second absorbing space to said first chamber and connections between said absorber and said generator whereby the absorption liquid circulates therethrough and therebetween.

21. In refrigerating apparatus, an evaporator, a porous wall within said evaporator, a receptacle for liquid arranged above said porous wall, a connection for flow of liquid from said receptacle to the space on one side of said porous wall, a series of baffling plates arranged above said receptacle, means to supply liquid onto said plates, said plates being arranged so that said liquid flows into said receptacle, a series of baffling members on that side of the porous wall to which liquid is conducted, means to supply gaseous fluid to the space above said receptacle, a connection between said space and the opposite side of said porous wall to that to which liquid is supplied and means to conduct fluid away from both sides of said porous wall.

22. Refrigerating apparatus comprising, in combination, a generator, a condenser, an evaporator, means to divide said evaporator into a first chamber and a second chamber, said means including a porous wall, a first absorbing member, a second absorbing member, a conduit for conducting fluid from said first chamber to said first absorbing member, a conduit for conducting fluid from said second chamber to said second absorbing member, means to conduct fluid from both said first and said second absorbing members to said first chamber, means to conduct liquid from said condenser to said second chamber, means to conduct weak absorption liquid from said generator to both absorbing members and means to conduct strong absorption liquid from both said absorbing members to said generator.

23. The method of moving a gas in a closed cycle which comprises interposing a porous flow resistance in the cycle, introducing a supplemental gas on one side of the porous flow resistance to cause a drop in partial pressure of the cycle gas and movement of gas in direction through the resistance to the said one side whereby the said one side constitutes an outflow side, introducing the mixture of cycle gas and supplemental gas thus formed into the presence of an absorbing agent capable of absorbing the supplemental gas but not the cycle gas, returning the cycle gas through the cycle to the inlet side of the porous resistance, removing the absorbing agent containing the supplemental gas from the cycle, expelling the supplemental gas from the absorbing agent, reintroducing the supplemental gas into the cycle on the outflow side of the porous resistance, reintroducing the absorbing agent into the cycle into the presence of the mixture of cycle gas and supplemental gas, removing supplemental gas and cycle gas from the inflow side of the porous resistance, introducing the gas last removed into the presence of an absorbing agent capable of absorbing the supplemental gas but not the cycle gas, returning unabsorbed cycle gas to the inflow side of the resistance, expelling the supplemental gas last removed from the last absorbing agent, reintroducing the last expelled supplemental gas into the cycle on the outflow side of the porous resistance, and reintroducing the last absorbing agent into the presence of the supplemental gas and cycle gas removed from the inlet side of the porous resistance.

24. In a method of refrigerating, those steps which consist in evaporating a liquid cooling agent in the presence of an auxiliary agent, producing an excess pressure by gaseous diffusion of the cooling agent and auxiliary agent and circulating the auxiliary agent under the influence of the excess pressure produced.

25. That improvement in the art of refrigerating through the agency of a cycle system containing a plurality of fluids which consists in interposing a porous flow resistance in the cycle of one fluid and introducing a supplemental fluid on one side of the porous resistance to produce flow of said one fluid through the resistance and through the cycle.

26. Refrigerating apparatus comprising an evaporator, an absorber, conduits forming a cycle for circulating an auxiliary agent between the evaporator and the absorber in the presence of which a cooling agent evaporates, a porous wall interposed in said cycle and means to circulate the cooling agent past one side of the porous wall to produce circulation of the auxiliary agent through said cycle.

27. Refrigerating apparatus comprising a generator, a condenser, an evaporator, an absorber, conduits forming a cycle for circulating an auxiliary agent between the evaporator and absorber in the presence of which a cooling agent evaporates, a porous wall interposed in said cycle and conduits forming a second cycle for circulating the cooling agent past one side of the porous wall to produce circulation of the auxiliary agent through the first-mentioned cycle, said second cycle including said generator, said condenser, said evaporator and said absorber.

28. Refrigerating apparatus comprising an evaporator, an absorber, conduits forming a cycle for circulating hydrogen between the evaporator and absorber, a porous wall interposed in said cycle and means to circulate ammonia past one side of the porous wall to produce circulation of hydrogen through the wall and through said cycle.

29. Refrigerating apparatus comprising a generator, a condenser, a diffusion vessel containing a first chamber and a second chamber, means to conduct fluid from both said chambers to said generator and means to conduct vapor from the generator to the condenser to be liquefied and evaporated.

30. Refrigerating apparatus comprising an evaporator, absorbing means, a plurality of cycles of circulation between said evaporator and said absorbing means, said plurality of cycles having a common chamber and said chamber having a porous wall permitting communication therethrough between the cycles.

31. Refrigerating apparatus comprising an evaporator, a porous wall dividing said evaporator into a plurality of chambers, a condenser for supplying liquefied cooling agent to one chamber and an absorber for supplying a gas of lower molecular weight than the cooling agent to the other chamber.

32. Refrigerating apparatus comprising a first evaporator chamber, a second evaporator chamber, a first absorber chamber, a second absorber chamber, means including conduits forming a first cycle of circulation between said first evaporator chamber and said first absorber chamber, and a second cycle of circulation between said second evaporator chamber and said second absorber chamber and for producing circulation in said first cycle due to forces created within said cycle and for producing circulation in said second cycle due to excess pressure developed in said second cycle.

33. That improvement in the art of refrigerating which consists in circulating fluid partly by means of gravity due to difference in specific weights of different fluids and partly due to difference in rates of diffusion of fluids of different molecular weight through a porous material.

34. That improvement in the art of refrigerating by the aid of a system containing refrigerant fluid and additional fluid for equalizing pressure, which fluids have different molecular weights which consists in generating force within the system due to difference in rates of diffusion of the different fluids through porous material and circulating the additional fluid in the system due to said force.

35. That improvement in the art of refrigerating by the aid of a system containing a plurality of fluids of different molecular weights which consists in generating force within the system due to the difference in the rates of diffusion of the different fluids through a porous material and circulating fluid in the system due to said force.

36. An evaporator, means separating said evaporator into a plurality of chambers and means to circulate a plurality of fluids through the evaporator, the first-mentioned means including a porous wall and a liquid seal, said liquid seal acting to balance an excess of pressure produced in one of the chambers due to diffusion of fluid through said porous wall.

37. Refrigerating apparatus comprising a generator, a condenser, an evaporator, an absorber, means to produce a plurality of cycles of circulation between the evaporator and absorber, means to circulate absorption liquid from the generator, into each of the plurality of cycles and back to the generator, means to conduct vapor from the generator to the condenser, means to conduct liquid from the condenser to the evaporator and means dependent on difference in molecular weights of fluids to transfer fluid from one of said cycles to another.

38. Refrigerating apparatus comprising a generator, a condenser, an evaporator, an absorber, means to produce a plurality of cycles of circulation between the evaporator and absorber, means to circulate absorption liquid from the generator, into each of the plurality of cycles and back to the generator, means to conduct vapor from the generator to the condenser, means to conduct liquid from the condenser to the evaporator and a porous wall forming a restricted communication between said cycles.

39. Refrigerating apparatus comprising a diffusion vessel separated into different chambers by a porous wall and a liquid seal.

In testimony whereof we hereunto affix our signatures.

CARL GEORG MUNTERS.
JOHN GUDBRAND TANDBERG.